United States Patent [19]

Scalora et al.

[11] Patent Number: 5,740,287
[45] Date of Patent: Apr. 14, 1998

[54] OPTICAL SWITCH THAT UTILIZES ONE-DIMENSIONAL, NONLINEAR, MULTILAYER DIELECTRIC STACKS

[75] Inventors: Michael Scalora; Jonathan P. Dowling; Charles M. Bowden, all of Huntsville; Mark J. Bloemer, Athens; Michael D. Tocci, Huntsville, all of Ala.

[73] Assignee: The United States of America as represented by the Secretary of the Army, Washington, D.C.

[21] Appl. No.: 568,728

[22] Filed: Dec. 7, 1995

[51] Int. Cl.$^6$ .................................................. G02B 6/10
[52] U.S. Cl. ........................ 385/6; 385/131; 359/244
[58] Field of Search ............................ 359/244; 385/16, 385/129, 130, 131

[56] References Cited

U.S. PATENT DOCUMENTS

| | | | |
|---|---|---|---|
| 4,597,638 | 7/1986 | Chemla et al. | 359/244 |
| 4,818,079 | 4/1989 | Maserjian | 359/244 |
| 5,414,726 | 5/1995 | Raj et al. | 359/244 |

OTHER PUBLICATIONS

Optical Limiting and Switching of Ultrashort Pulses in Nonlinear Photonic Band Gap Material By Michael Scalora, Jonathan P. Dowling, Charles M. Bowden, and Mark J. Bloemer Published. 5 Sep. 1994 in vol. 73, No. 10; pp. 1368–1371 Physical Review Letters, By the American Physical Society.

*Primary Examiner*—John Ngo
*Attorney, Agent, or Firm*—Freddie M. Bush; Howard G. Garner

[57] ABSTRACT

An optical switch in a one-dimensional multilayer dielectric stack having a photonic band gap, composed of at least two groups of layers of dielectric material whose operating wavelength is near the edge of said photonic band gap. At least one layer of each of the groups is composed of a nonlinear $c_3$ dielectric material, which creates an intensity-dependent shift in the location of the band gap and produces a dynamical change in the transmissive and reflective properties of the multilayer dielectric stack in response to changes in the intensity of light or the transmittance of electromagnetic radiation passing through the multilayer dielectric stack. The width of the photonic band gap is determined by the differences between the refractive indices of the nonlinear dielectric material and that of the other layers of dielectric material in the multilayer dielectric stack.

13 Claims, 13 Drawing Sheets

$$n_2 = n_0 + c_3 \, I$$

$$\text{Probe}: I_0 \ll I$$

$$n_2 = n_0 - c_3 I$$

Probe: $I_0 \ll I$

OPTICAL SWITCH THAT UTILIZES ONE-DIMENSIONAL, NONLINEAR, MULTILAYER DIELECTRIC STACKS

DEDICATORY CLAUSE

The invention described herein may be manufactured, used, and licensed by or for the Government for governmental purposes without the payment to us of any royalties thereon.

BACKGROUND OF THE INVENTION

This invention relates to an optical switch in a one-dimensional, nonlinear, multilayer dielectric stack having a photonic band gap.

In order to explain the background of the invention, the prior art has been illustrated in the following Figures of the drawings, wherein:

FIG. 1 is a schematic view of a prior art multilayer dielectric stack having a photonic band gap known as a dielectric mirror;

FIG. 2 is a graphic illustration of the transmittance curve of light through a first embodiment of the dielectric mirror shown in FIG. 1: and FIG. 3 is a graphic illustration of the transmittance curve of light through a second embodiment of the dielectric mirror shown in FIG. 1.

FIG. 1 shows a multilayer dielectric stack with alternating layers having indices of refraction $n_1$ and $n_2$, and thicknesses a and b, respectively. Also shown is incident light from the left of the stack, and the transmitted light to the right. The transmittance T is defined as the ratio of the transmitted to the incident light power.

In FIGS. 2 and 3, the transmittance curve is plotted for a multilayer dielectric stack with the number of layers equal to 10. In FIG. 2, $n_1=1$ and $n_2=1.41$, while in FIG. 3, $n_2=2$. This shows how the photonic band gap region, $\Delta\omega$, increases with index differences $\Delta n = n_2 - n_1$.

It has been found that nonlinear effects near the photonic band edge of a multilayer dielectric stack cause a dynamical shift in the location of the band gap. It has been known for many years that a multilayer dielectric stack, when arranged in such a way that alternating layers have a high index of refraction, e.g. $n_2$, and a low index, e.g. $n_1$, will exhibit frequency-selective transmittance of electromagnetic radiation or light. When light of frequency $\omega$ is incident on the multilayer dielectric stack, and normal to the planes of the layers (see FIG. 1), for certain values of $\omega$, substantial or even complete transmittance of radiant power through the multilayer dielectric stack occurs, while at other values of $\omega$, the transmittance T drops to nearly zero and the multilayer dielectric stack acts as a highly-reflective mirror. This phenomenon is due entirely to the optical interference of the light as it undergoes multiple reflections in the multilayer dielectric stack. Large transmittance occurs when light moving in the forward direction interferes constructively and transmittance is minimized when the forward-moving light interferes destructively. The range of frequencies for which either transmittance or reflection will occur is, in general, a complicated function of the refractive index values, $n_1$ and $n_2$, in the low and high index layers, respectively, as well as the physical thicknesses of these layers, e.g., thicknesses a and b for $n_1$ and $n_2$, respectively. In general, a range of frequencies over which substantial light transmittance occurs is called a photonic pass-band or photonic band, and a range over which negligible transmittance occurs is called a photonic stop band or photon band gap (see FIGS. 2 and 3). These terms are given in analogy with the electronic bands and band gaps of semiconductor theory, found in, e.g., W. J. Jones' and N.H. March's Theoretical Solid State Physics, published by Wiley Interscience, 1973. It is important to note that, in the prior art, once the material specifications of the multilayer dielectric stack are given, i.e., once the multilayer dielectric stack is constructed, then the spectral width $\Delta\omega$ and central frequency $\omega_o$ of the photonic band gaps are fixed and cannot be altered.

To get a different transmittance spectrum, one must construct a different multilayer dielectric stack with different material specifications. In the prior art, one common type of a one-dimensional multilayer dielectric stack, i.e., one that exhibits a particularly simple transmittance spectrum, is the dielectric mirror. In the dielectric mirror, in addition to having alternating dielectric layers of thicknesses a and b with indices $n_1$ and $n_2$, respectively, there is an additional condition, namely, each of the layers has an optical thickness or length of a quarter of some fixed, reference wavelength $\lambda_o$. Note that the reference wavelength $\lambda_o$ and a corresponding reference frequency $\omega_o$ are related through $\lambda_o = 2\pi c/\omega_o$, where c is the vacuum speed of light. Hence, a fixed value of $\lambda_o$ corresponds to some fixed, easily calculated value of $\omega_o$ (and vice versa). This condition can be written as $n_1 a = \lambda_o/4 = n_2 b$. This additional constraint on the multilayer dielectric stack causes maximal destructive interference in forward-propagating radiation with frequencies $\omega$ near the mid-gap reference frequency $\omega_o$. In other words, there is a photonic band gap in the transmission spectrum with a mid-gap point centered at $\omega_o$ (see FIG. 2). From the work of A. Yariv and P. Yeh, Optics in Crystals, published by Wiley Interscience, 1984, a simple estimate of the width of the photonic band gap $\Delta\omega$ can be given by the relation $\Delta\omega = \omega_o (n_2 - n_1)/(n_2 + n_1)$, with a similar relation for $\Delta\lambda$. Hence, $\Delta\omega$ can be made larger or smaller by making the $n_2$ larger or smaller with respect to $n_1$. What is important to notice is that, in the prior art, the width of the photonic band gap $\Delta\omega$ and the mid-gap value $\omega_o$ are fixed once $n_1$, $n_2$, a, and b are fixed. The only way to change $\omega_o$ or $\Delta\omega$ is to change the underlying structure specification.

SUMMARY OF THE INVENTION

In all of the prior art multilayer dielectric stacks, the indices of refraction $n_1$ and $n_2$ are taken to be constants, that are unchanged as light propagates through the multilayer dielectric stack. However, in the prior art of nonlinear optical materials, it is well known that there is a small class of dielectric materials, called nonlinear materials, whose index of refraction n is not a constant, independent of the incident light, but rather whose index of refraction changes with increasing intensity I of the light field. For these nonlinear materials, the index n obeys a simple linear relationship to the light intensity I via $n = n_0 + c_3 I$, where $c_3$ is a small nonlinear coefficient that is an intrinsic property of the nonlinear dielectric material in question, and $n_o$ is a fixed, constant index that the material exhibits for low intensities I. In general, nearly all materials have an index of refraction that is dependent on the optical intensity of the light passing through the material, but very few materials possess a nonlinear coefficient large enough to be useful. Now, from the relation $\Delta\omega = \omega_o (n_2 - n_1)/(n_2 + n_1)$ one can see that if, e.g., $n_2$ were one of these nonlinear materials with $n_2 = n_o + c_3 I$, then the frequency width $\Delta\omega$ of the photonic band gap would no longer be an immutable property of the structure, but rather a dynamic and changeable feature that varies approximately linearly with the local light intensity (see FIGS. 2 and 3). It is this mutability of the width $\Delta\omega$ of the photonic band gap with intensity that is the essence of our invention. The invention is achieved by judiciously combining the prior arts of one-dimensional multilayer dielectric stacks, with the prior art of optically-nonlinear dielectric materials, as demonstrated below.

Although these are well known phenomena, the invention is directed to the dynamics of an electromagnetic wave pulse that impinges on a one-dimensional multilayer dielectric stack, whose carrier frequency $\omega'$ or wavelength $\lambda'$ is near the edge of the photonic band gap. (See FIG. 2.) In addition, the invention requires that at least one of the indices of refraction of the dielectric material in the structure be sufficiently nonlinear, i.e., $n_2$ or $n_1$ is sufficiently intensity-dependent. In this case the location of the photonic band gap in the frequency domain will shift, as a function of the intensity of the incident radiation as outlined in the Background.

The invention requires that at least every other layer of a one-dimensional multilayer dielectric stack be composed of a nonlinear dielectric material. The effect is an intensity-dependent shift in the location of the photonic band gap, and therefore a dynamical change in the transmissive and reflective properties of the structure. In frequency space, the width of the photonic band gap is determined by the difference between the refractive indices. Let us choose $n_2 > n_1$, and assume $n_2$ is nonlinear. That is, $n_2 = n_0 + c_3 I$, where $c_3$ is a small nonlinear coefficient, I is the field intensity in the dielectric material, and $n_0$ is a fixed background index. Thus, if $\Delta n = n_2 - n_1$, then $\Delta n$ increases with increasing I provided $c_3 > 0$, and decreases provided $c_3 < 0$. If one considers an incident beam whose frequency $\omega'$ is tuned near the photonic band edge (i.e. the transition region between the photonic pass band and the photonic band gap), and whose intensity I is large enough so that the product $c_3 I$ significantly contributes to the total index $n_2$, then for positive nonlinear coefficient $c_3$, the width of the photonic band gap increases in proportion to the increase in $\Delta n$. As the beam enters the structure, a dynamical shift occurs in the location of the photonic band gap. The frequency $\omega'$ of the electromagnetic radiation now falls inside the photonic band gap, thus effectively forbidding that frequency from propagating. (See FIG. 2.) This constitutes the effect that gives rise to the optical limiter of the invention.

It is important to tune to a frequency $\omega'$ in the photonic pass band very near to the low intensity photonic band edge for two reasons: (1) the closer $\omega'$ is to the photonic band edge, the easier it is for a small change in $n_2$ to move the photonic band gap toward $\omega'$; and (2) Near the photonic band edge, the velocity of light is very slow, causing electromagnetic energy intensity I to build up to very high values at photonic band edge frequencies $\omega'$. Since in general, $c_3$ is very small, it is important to have this photonic band edge amplification of the intensity I, so that the product $c_3 I$ is large enough to cause a significant shift in the photonic band gap.

DETAILED DESCRIPTION OF THE INVENTION

Figure 1:
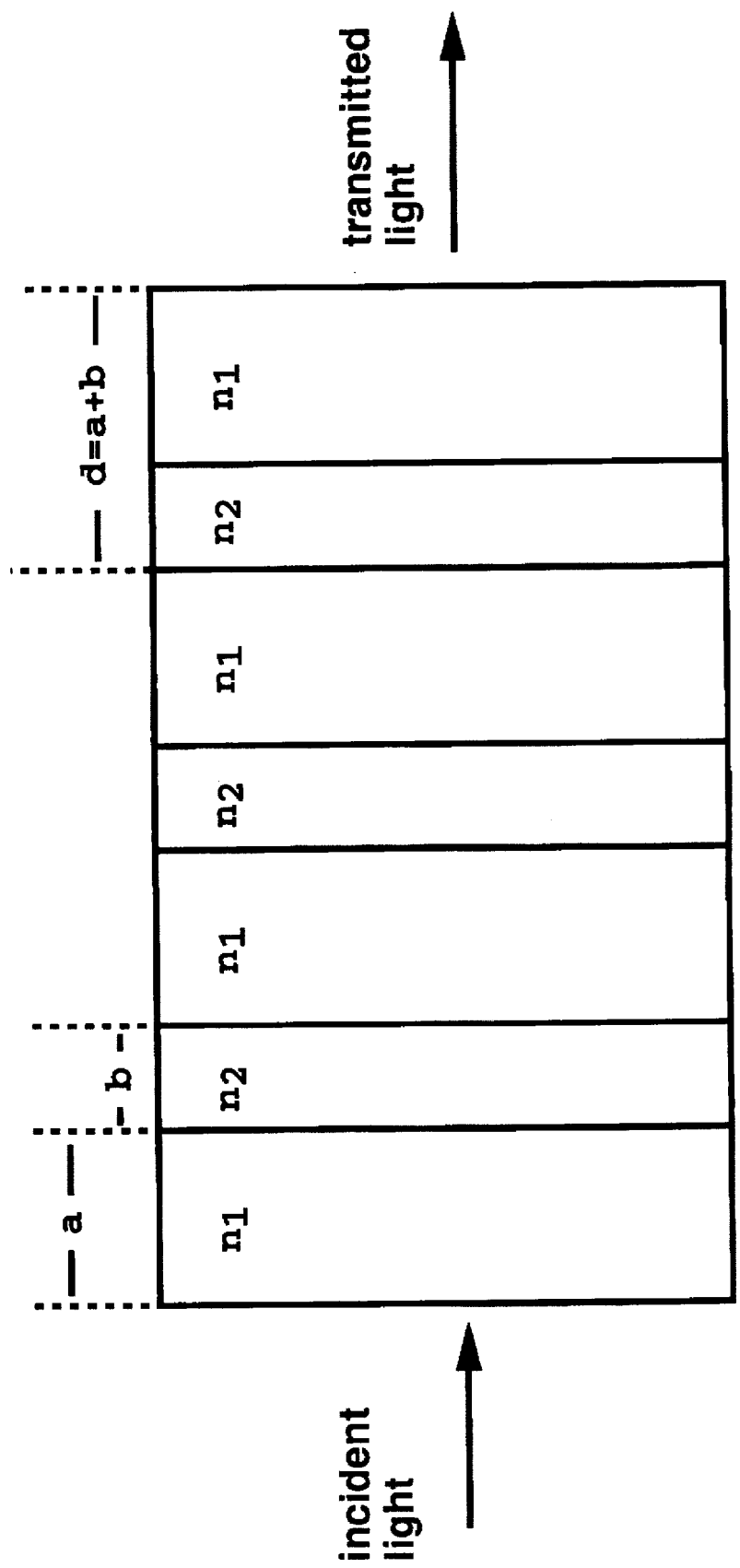
FIG. 1 is a schematic view of prior art multilayer dielectric stack having a photonic band gap known as a dielectric mirror.
Figure 2:
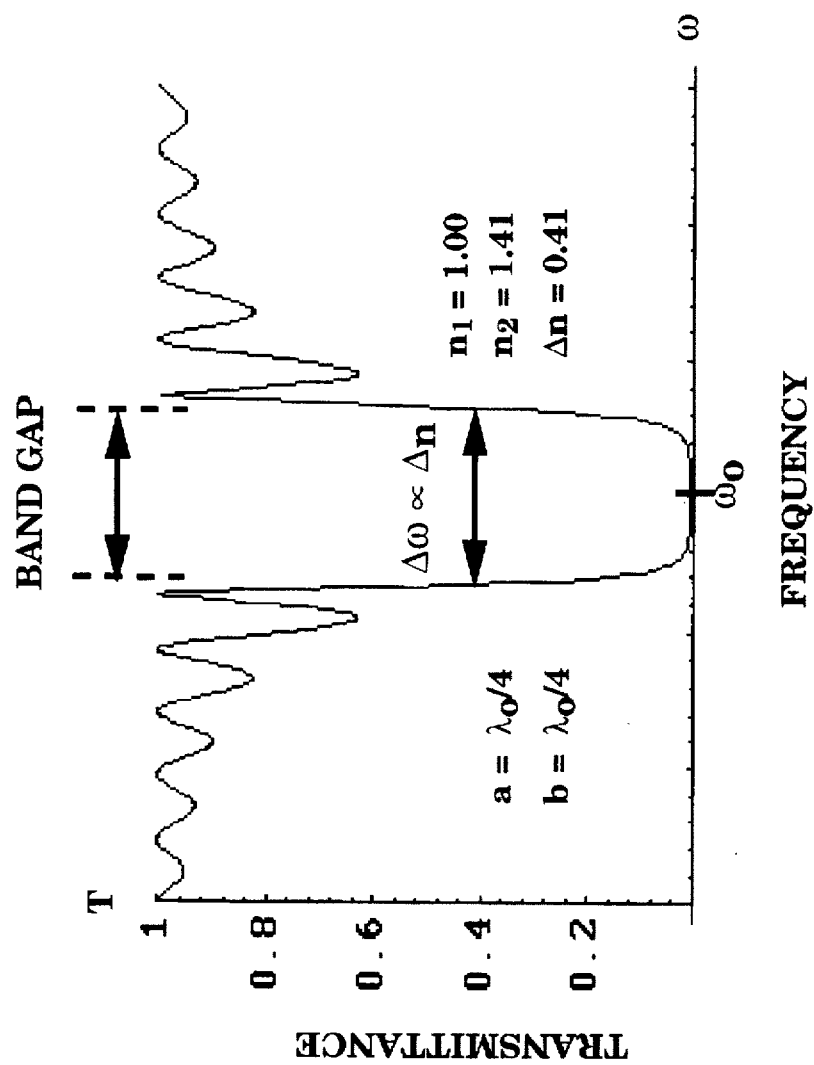
FIG. 2 is a graphic illustration of the transmittance curve of light through a first embodiment of the dielectric mirror shown in FIG. 1.
Figure 3:
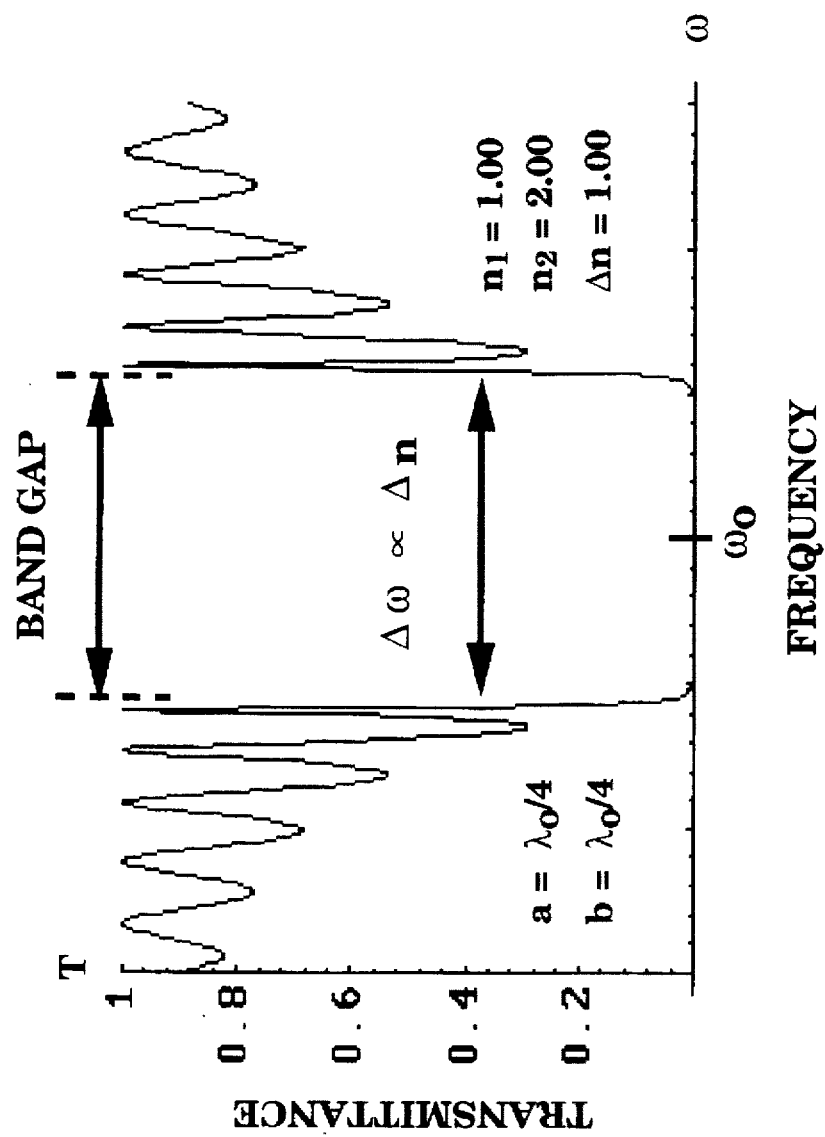
FIG. 3 is a graphic illustration of the transmittance curve of light through a second embodiment of the dielectric mirror shown in FIG. 1.
Figure 4:
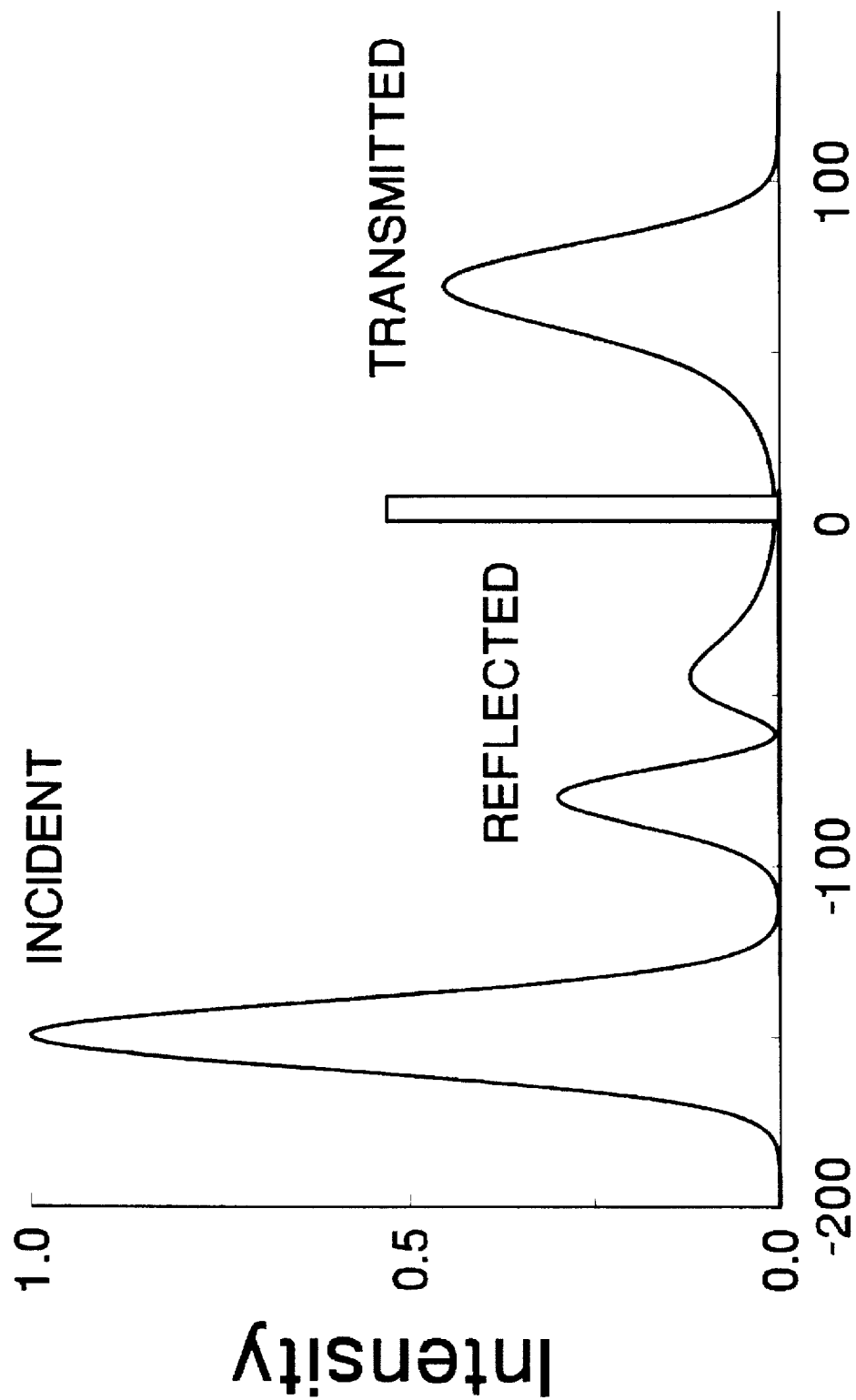
FIG. 4 is a diagrammatic graphic view of the switch of the invention for electromagnetic radiation of intensity 1.
Figure 5:
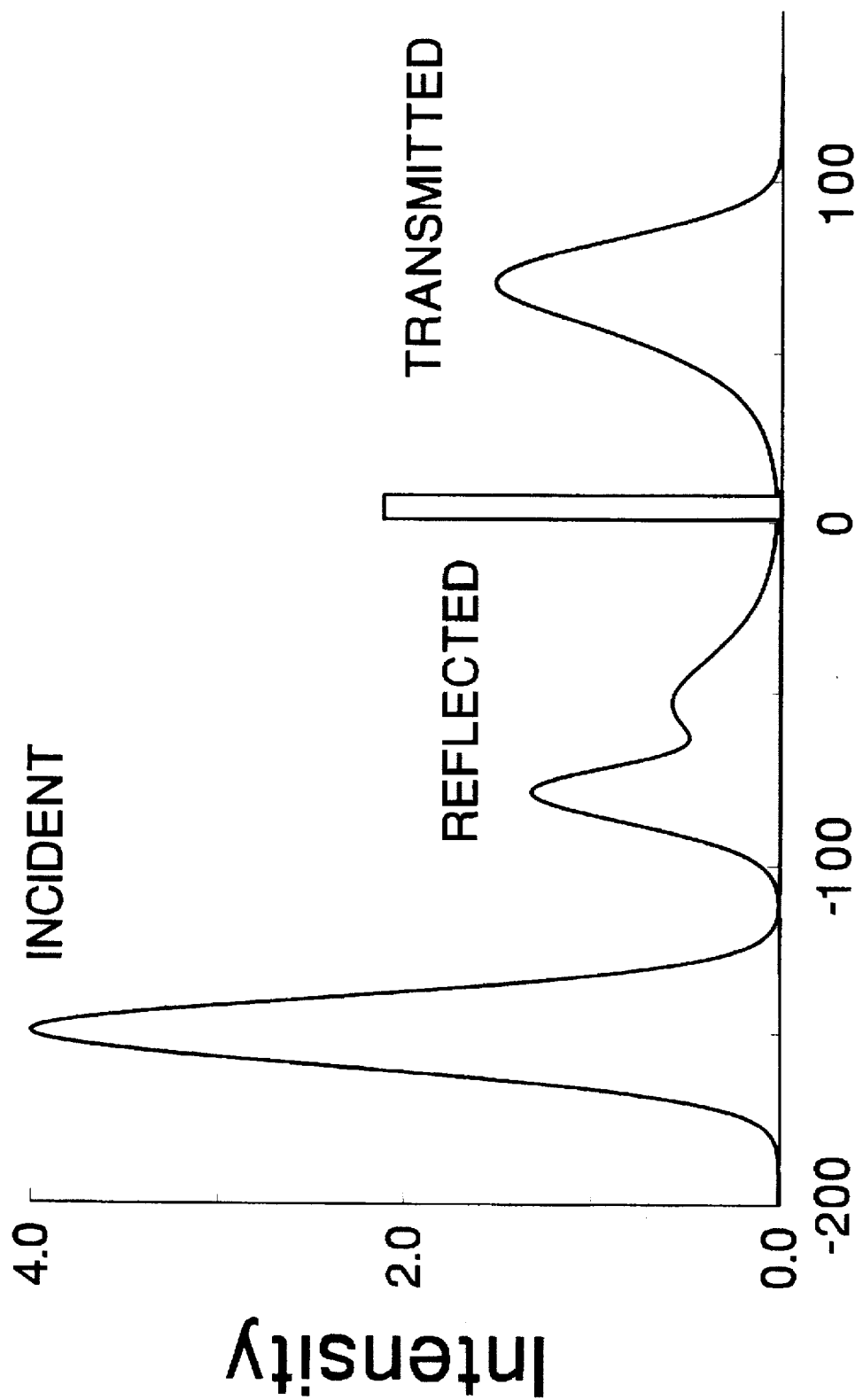
FIG. 5 is a diagrammatic graphic view of the switch of the invention for electromagnetic radiation of intensity 4.
Figure 6:
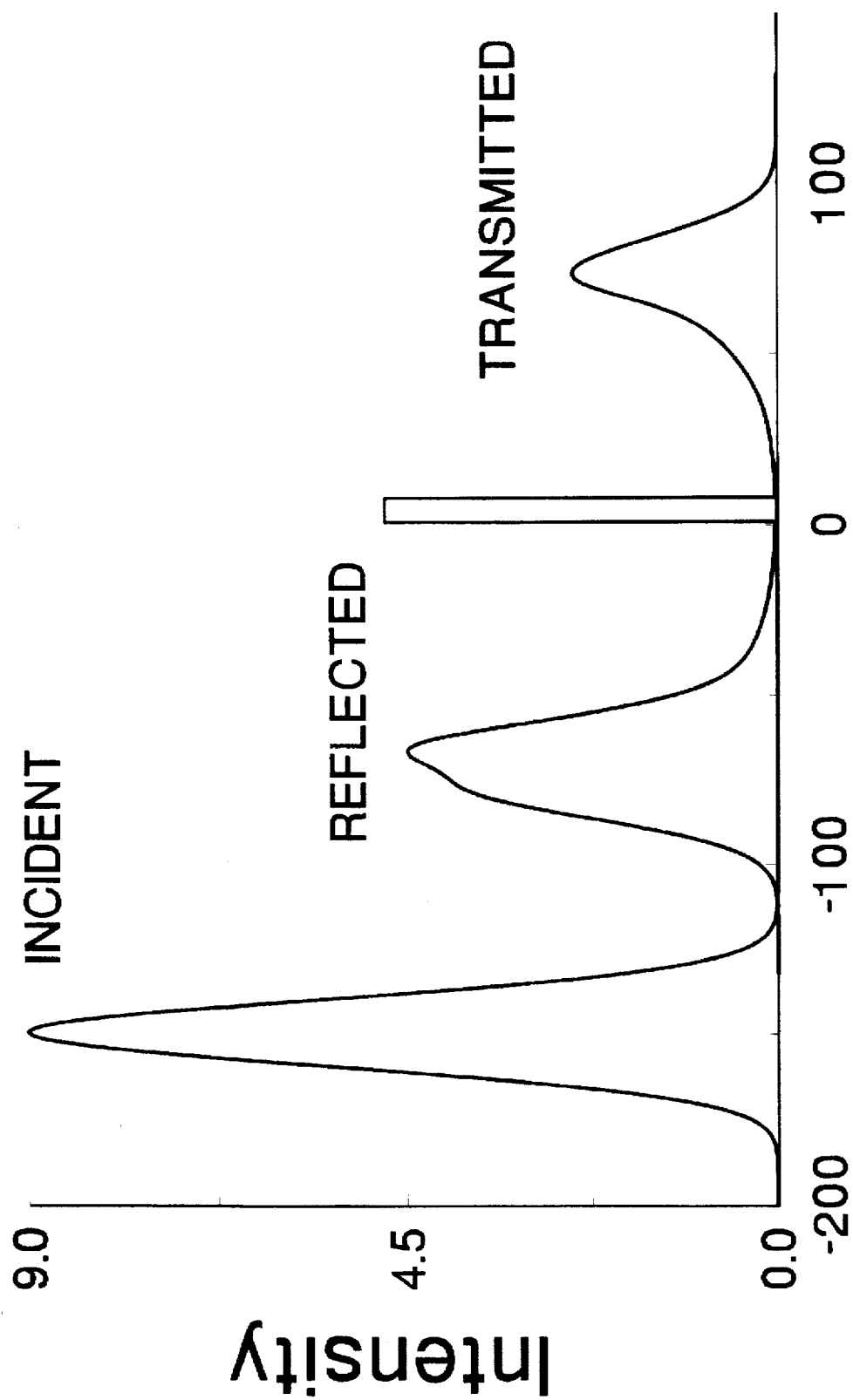
FIG. 6 is a diagrammatic graphic view of the switch of the invention for electromagnetic radiation of intensity 9.
Figure 7:
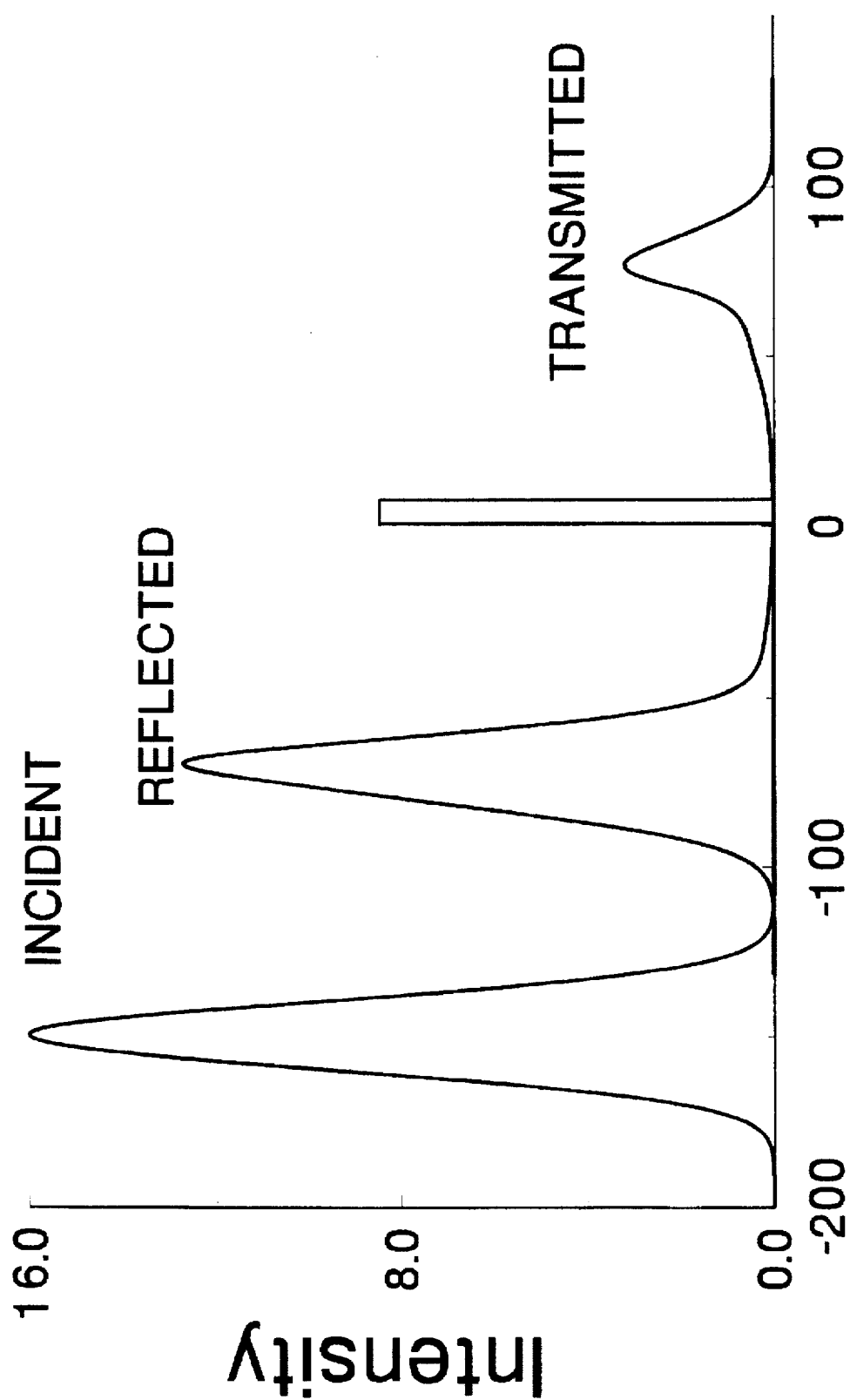
FIG. 7 is a diagrammatic graphic view of the switch of the invention for electromagnetic radiation of intensity 16.

Optical limiting is a one-beam operation of the invention depicted in FIGS. 4–7 of the drawings. A pulse of electromagnetic radiation having a Gaussian shape is launched from the left of the figures, and is incident on a nonlinear, multilayer dielectric stack that has a photonic band gap. As the light propagates inside the dielectric material, a dynamical shift of the photonic band gap occurs, inhibiting transmittance. This effect becomes more pronounced with increasing input intensity. In FIG. 7, the peak pulse intensity is 16 times larger than in FIG. 4. The photonic band gap in this case has become wider, and hence, FIG. 7 shows that more of the beam is reflected for larger intensities. This type of switching behavior, whereby an increase in electromagnetic intensity causes a self-induced switch-off, is sometimes called optical limiting, and the device is functioning as an optical limiter.

Figure 8:
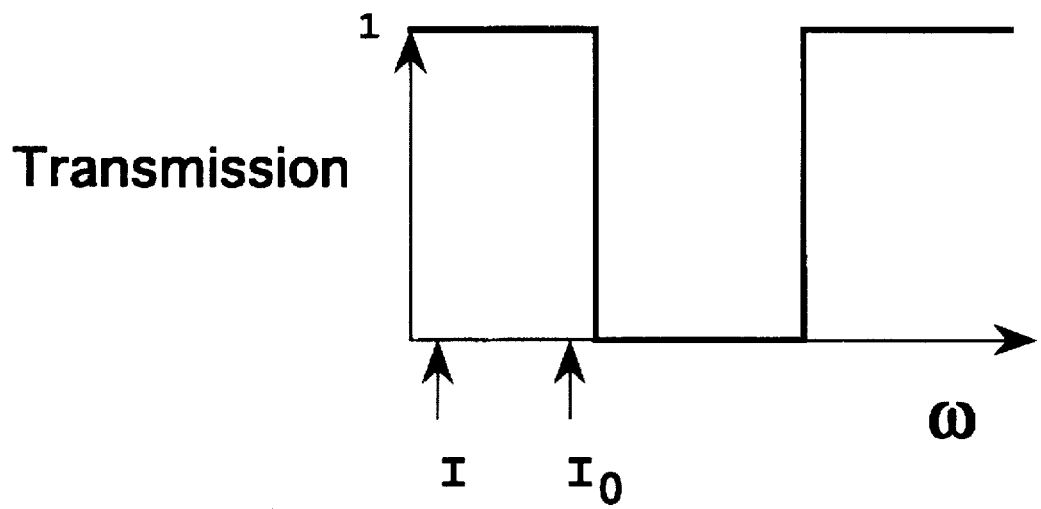
FIG. 8 is a diagrammatic graphic view of the switch of the invention, showing the switching behavior of the switch using two optical beams of different frequencies.
Figure 8:
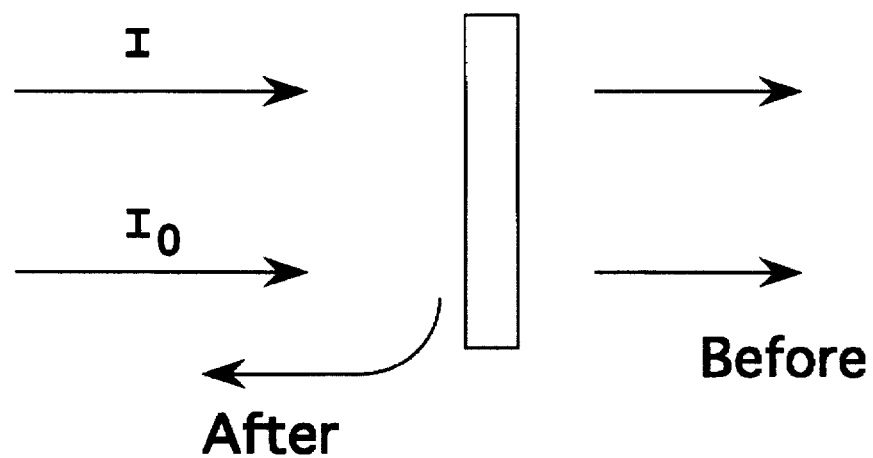

Now consider operating the device when multiple beams of different frequency are incident on the one-dimensional, nonlinear, multilayer dielectric stack. Assume that $I_1$ is the intensity of a strong pump capable of altering the index of refraction of the dielectric material, as described above, and $\omega_1$ is its center frequency. Further assume that $I_2$ is the intensity of a probe beam such that $I_1 >> I_2$, and the center frequency of operation of $I_2$ is $\omega_2$. Now assume that both $\omega_1$ and $\omega_2$ are located in the band below the photonic band gap, but that $\omega_1$ is far below the photonic band gap, while $\omega_2$ is near the band edge, then both beams will initially be transmitted. As the beam of intensity $I_1$ alters the index of refraction, its effect is to widen the photonic band gap, and it will do so to such an extent that $\omega_2$ will be found inside the photonic band gap. Beam $I_2$ then shuts off since its frequency is now part of the forbidden frequency range, where an extremely high percentage of reflection occurs. This constitutes the operation of an optical switch that is sometimes called an optical transistor, and the switching dynamics described above are depicted schematically in FIG. 8.

For some dielectric materials, the nonlinear coefficient is found to be negative. That is, $n_2=n_0-c_3I$. This can also be used to generate switching behavior on the part of the nonlinear, multilayer dielectric stack. In this case, as $n_2$ decreases with increasing intensity, the width of the photonic band gap will decrease accordingly. If the frequency of operation $\omega_2$ of the probe beam $I_2$ is selected somewhere near the edge of the photonic band gap, but inside of it, none of it can be transmitted initially. Applying the pump beam $I_1$ will tend to decrease the width of the photonic band gap, and, if a certain power level is surpassed, the probe beam at $\omega_2$ may suddenly be found outside of the photonic band gap, in the photonic pass band, and its transmittance is thus allowed. This process also constitutes the basis of an optical switch that operates in a reciprocal fashion to the one described immediately above, and its operation is shown schematically in FIG. 9.

Figure 10:
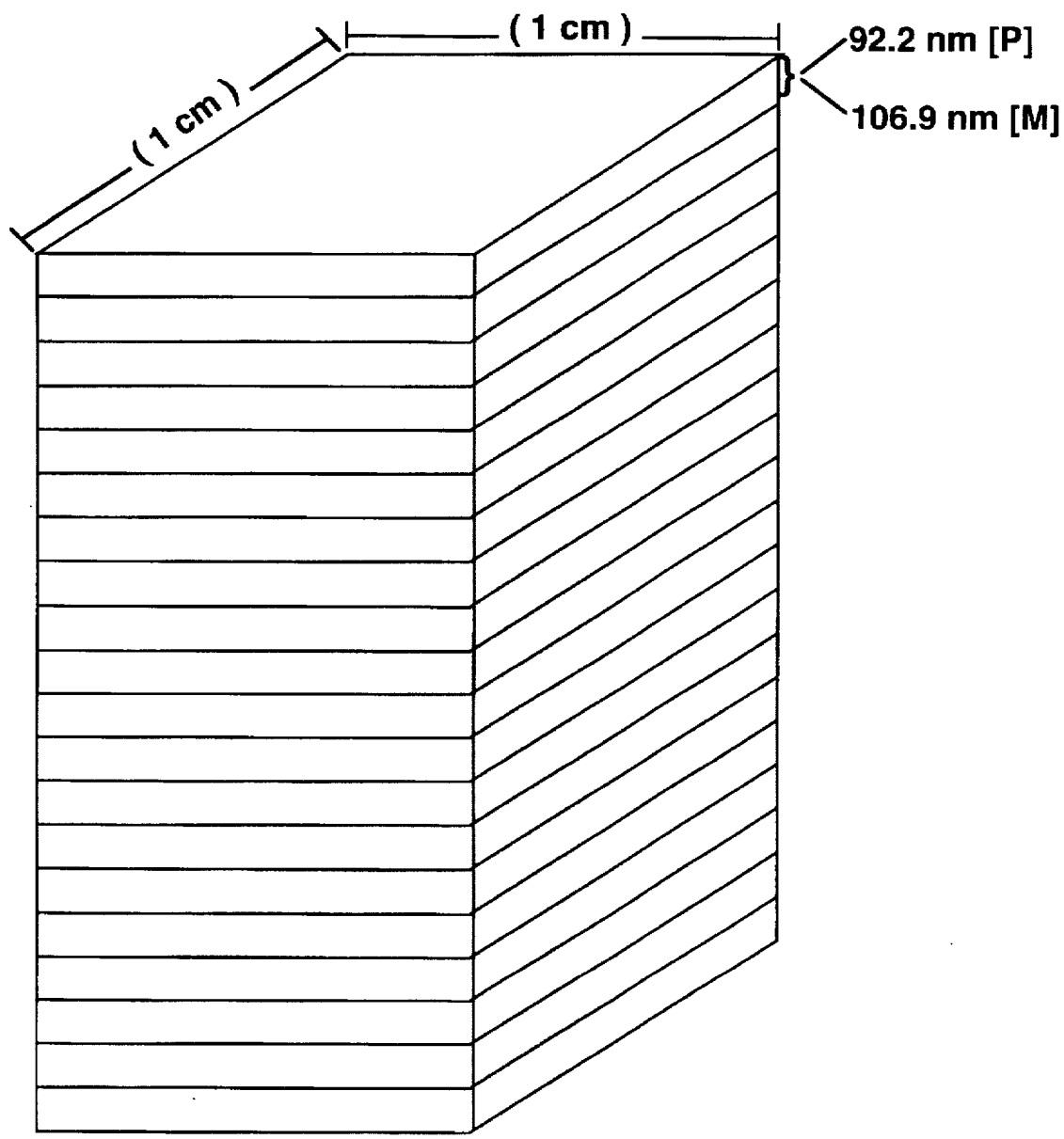
FIG. 10 is a perspective view of a stack of dielectric material of the switch of the invention having alternating layers of $MgF_2$.

The linear and nonlinear indices of refraction consist of two components, a real part and an imaginary part. The imaginary part of the index describes absorption in the material. Devices based on optical nonlinearities are very sensitive to absorption and any realistic model must include both linear and nonlinear absorption. The problem with nonlinear absorption is that as the intensity increases (to dynamically change the value of $n_2$) the absorption increases as well. Nonlinear absorption is the primary problem with most nonlinear devices. Since nonlinear absorption has only recently been recognized as a serious problem, very little experimental data exists on nonlinear absorption coefficients. In spite of the scarcity of data on nonlinear absorption, there is a polymer material (9-BCMU) which was recently shown to have a small nonlinear absorption coefficient. As an example embodiment of the optical switch, a multilayer structure of $MgF_2$ (magnesium fluoride) and polydiacetylene 9-BCMU ($[CH_2]_9OCONHCH_2OCOC_4H_9$) is examined. Magnesium fluoride is routinely used in optics for multilayer dielectric coatings. High quality thin films of polydiacetylene are grown with good precision using a chemical vapor deposition technique. The linear refractive indices of $MgF_2$ and polydiacetylene are $n_1=1.38$ and $n_0=1.6$, respectively, at an optical wavelength of 640 nm. The physical thicknesses of the layers are determined by the choice of the operating wavelength. An operating wavelength of ~640 nm is chosen where the nonlinear index of refraction of polydiacetylene is large, $c_3=+2\times10^{-7}$ cm$^2$/kW. The linear and nonlinear absorption coefficients for polydiacetylene are 840/cm and $9\times10^{-5}$ cm/kW, respectively. The linear absorption coefficient and nonlinear response of $MgF_2$ is negligible compared with that of polydiacetylene. The geometry of the limiter is shown in FIG. 10. The limiter consists of twelve and one-half periods of $MgF_2$/polydiacetylene for a total of 25 layers. Each of the $MgF_2$ layers is 106.9 nm thick and each of the polydiacetylene layers is 92.2 nm thick.

Figure 11:
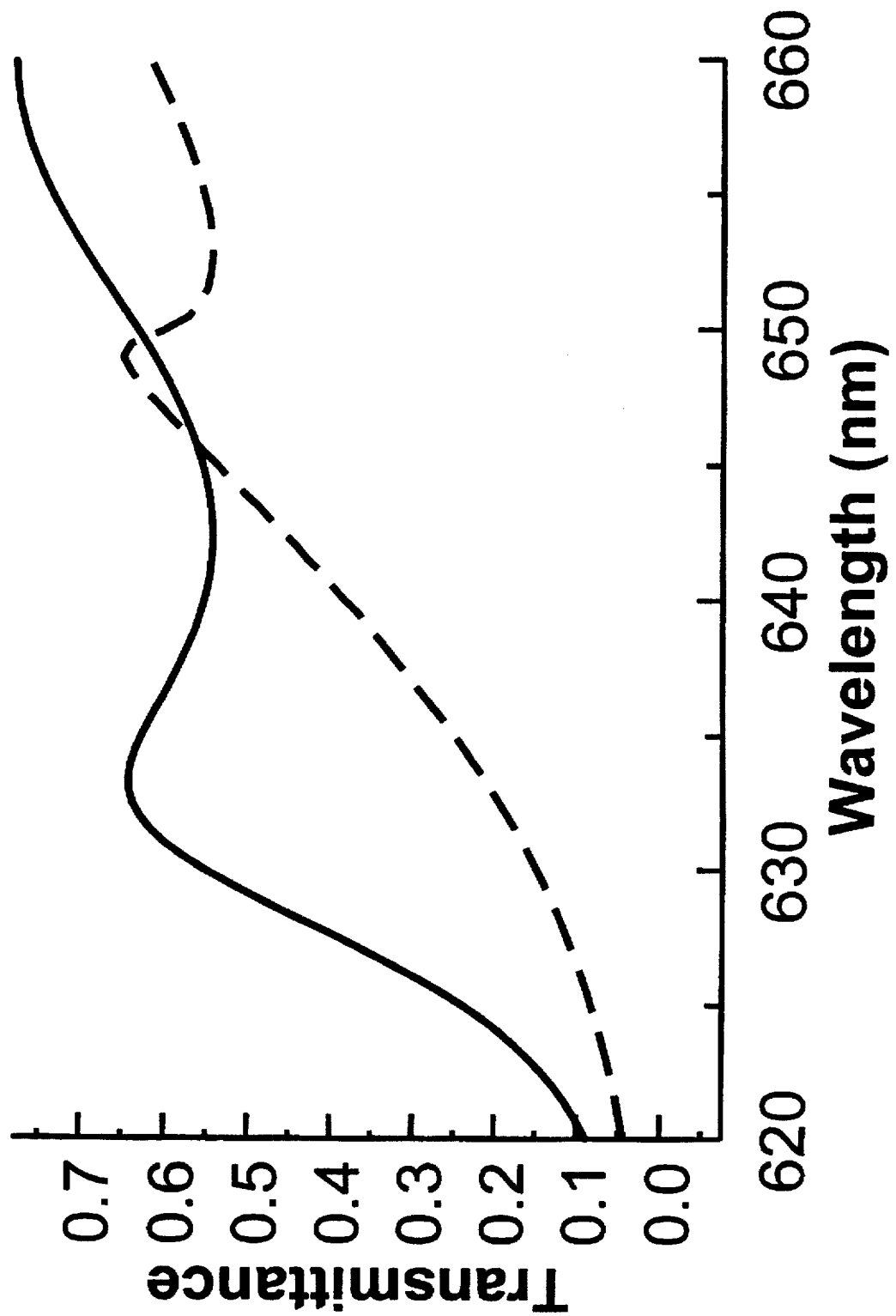
FIG. 11 is a diagrammatic graphic view of the switch of the invention, showing the transmittance of the switch at low intensities, and at an intensity of $100 MW/cm^2$.
Figure 12:
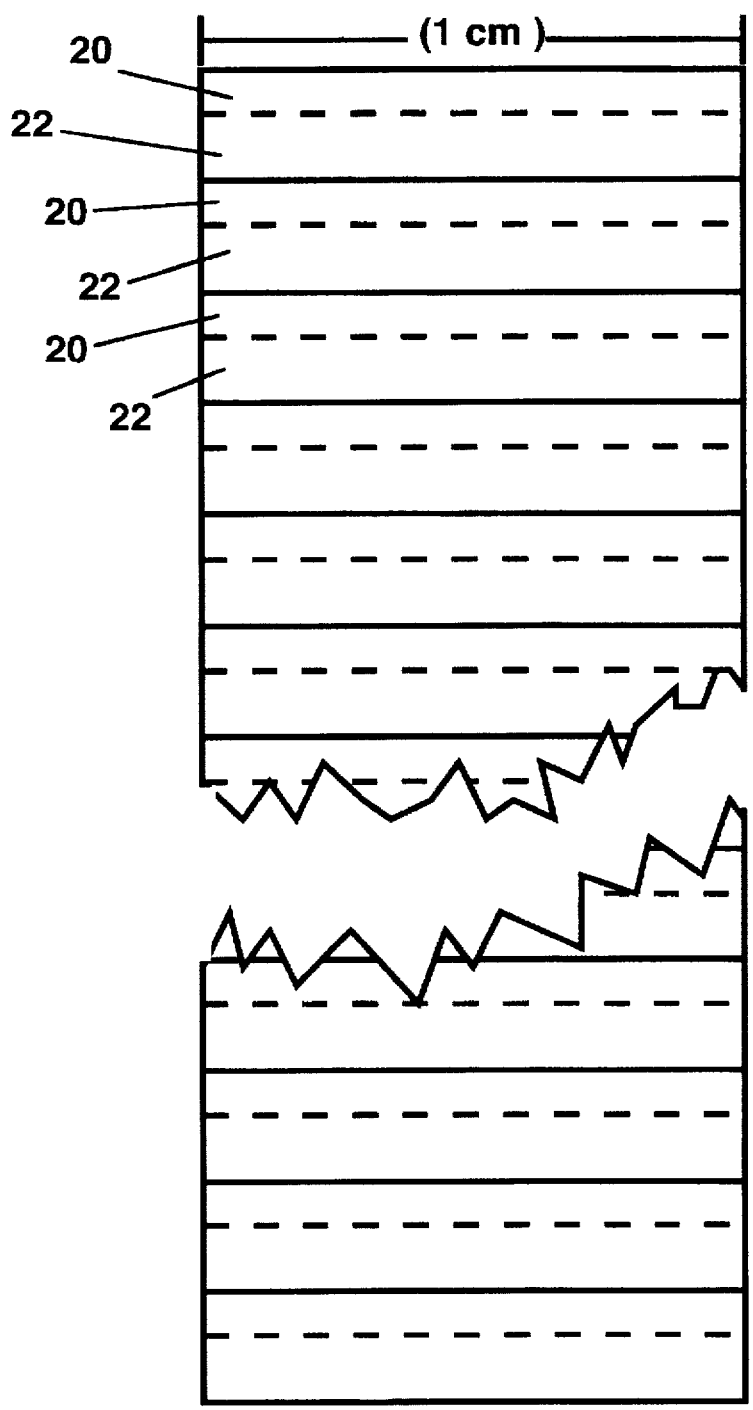
FIG. 12 is an enlarged plan view of the switch of the invention, showing a pair of layers in each group.

The transmittance of the $MgF_2$/polydiacetylene limiter is shown in FIG. 11. In the low intensity regime (solid line) where $c_3I<<n_0$, the photonic band edge is at a wavelength of ~633 nm. At shorter wavelengths the transmittance drops rapidly due to the presence of the photonic band gap. At higher intensities, the index of refraction of the polydiacetylene increases which causes the photonic band gap to widen. The dashed line in FIG. 11 is the calculated transmittance of the limiter at an input intensity of 100 MW/cm$^2$. The increase in the photonic band gap width has moved the photonic band edge to ~649 nm. For light having a wavelength of 632 nm, the transmittance of the limiter is reduced by a factor of 3.3 at input intensities of 100 MW/cm$^2$. The transmittance of the limiter decreases as the intensity increases. It would be possible to make an optical limiter using a single layer of a material with a large nonlinear absorption coefficient; however, the results would be much less dramatic. In the embodiment of FIG. 10, the limiting action due to nonlinear absorption is negligible compared to the reduced transmittance as a result of the shift in the photonic band gap.

A limiter is also possible using a material with a negative nonlinearity. In this case the nonlinear material must be in the low index layers. The response time of the device depends on the type of optical nonlinearity. In the case of polydiacetylene, the response time is on the order of 1 picosecond. Other nonlinear materials can be used which have larger nonlinear coefficients but in general they will have a slower response time. As new materials become available, the device performance will improve.

The multilayer dielectric stack of FIG. 10 can also be used as an optical switch. Light of one frequency can control the transmittance of light having a different frequency. In this case the strong pump operating at a frequency outside the photonic band gap can control a beam of light having a frequency near the photonic band edge ~633 nm.

Figure 9:
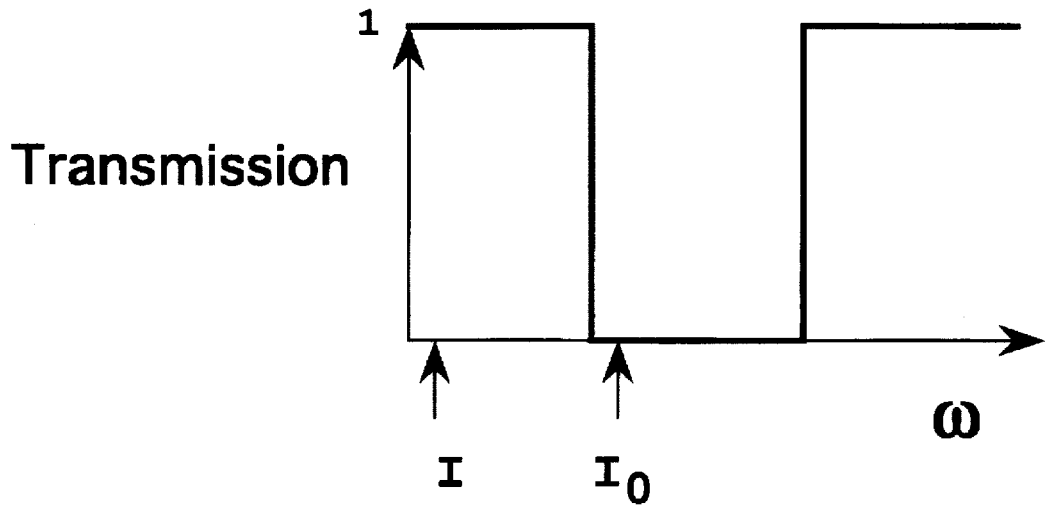
FIG. 9 is a diagrammatic graphic view of the switch of the invention, showing the switching behavior of the switch using two optical beams of different frequencies, using a nonlinear coefficient which has a negative sign.
Figure 9:
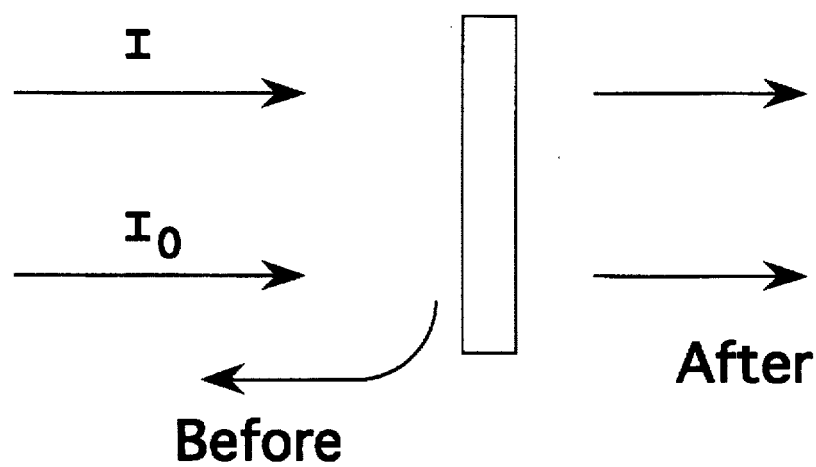

Referring now to FIG. 9, wherein a pair of layers 20 and 22 are arranged in groups throughout a stack 24. A multitude of groups of layers 20 and 22 compose stack 24, up to ten or more such groups, all of which must be comprised of the same two layers 20 and 22 throughout. The number of pairs in each stack will depend on the difference in the index of refraction of layers 20 and 22. The greater the difference in such indices the less the number of such groups required for the optimum performance of the switch.

While layer 20 is shown to be thinner than layer 22, and this will always be the case in this embodiment of the invention, either layer can be formed of the nonlinear material.

Figure 13:
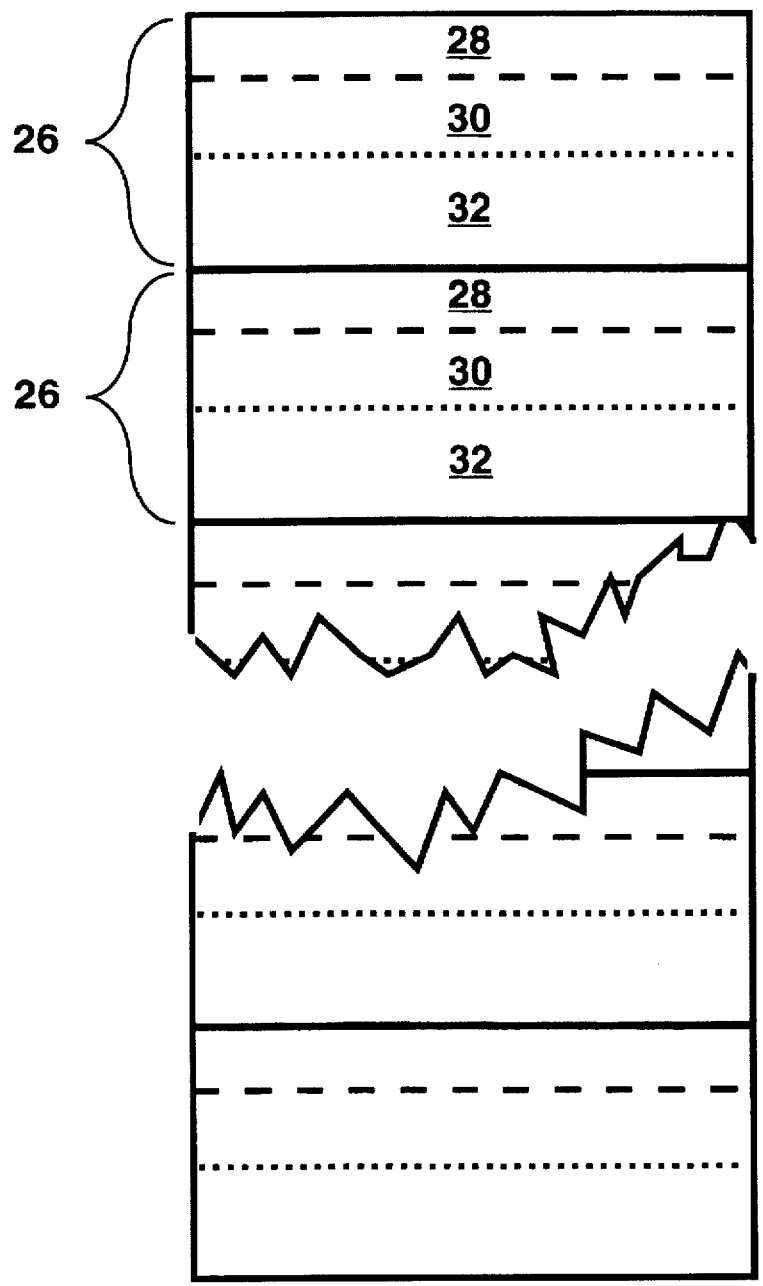
FIG. 13 is an enlarged plan view of the switch of the invention, showing three layers in each group.

FIG. 13 shows another arrangement of three layers in each of the groups 26. Each of the groups of this embodiment comprises layers 28, 30, and 32, all of which are a different thickness. However, it is to be understood that the thicknesses of each of the layers will vary in accordance with the indices of refraction of the materials making up the layers.

Accordingly, the scope of the invention should be limited only by the claims appended hereto.

We claim:

1. An optical switch in a one-dimensional multilayer dielectric stack having a photonic band gap, comprising:

(a) a stack of at least two groups of layers of dielectric material whose operational frequency is near the edge of said photonic band gap;

(b) at least one layer of each of said groups being composed of a nonlinear $c_3$ dielectric polymer material, creating an intensity-dependent shift in the location of said photonic band gap and producing a dynamical change in the transmissive and reflective properties of said structure in response to changes in the intensity of light or the transmittance of electromagnetic radiation passing through said multilayer dielectric nonlinear stack;

(c) wherein said one layer of each of said groups has a negative nonlinear coefficient $c_3$, such that the index of refraction of one of the materials in said stack, $n_2=n_0-c_3I$, where I equals the intensity of the light propagating in said dielectric stack, for generating switching behavior, with linear and nonlinear absorption coefficients not exceeding 840/cm and $9\times10^{-5}$ cm/kW, respectively; such that the magnitude of the nonlinear index of refraction not be smaller than $c_3=2\times10^{-7}$ cm$^2$/kW; and (d) wherein the width of said photonic band gap is determined by the differences between the refractive indices of said nonlinear dielectric polymer material and that of the other layers of dielectric material in said multilayer dielectric stack.

2. An optical switch in a one-dimensional multilayer dielectric stack having a photonic band gap, as set forth in claim 1, wherein said polymer layer having a negative nonlinear coefficient, and wherein the width of said photonic band gap decreases with increases in said intensity when said layer has the higher index of refraction of said group.

3. An optical switch in a one-dimensional multilayer dielectric stack having a photonic band gap, as set forth in claim 1, wherein said layer has a negative nonlinear coefficient, and wherein the width of said photonic band gap increases with increases in said intensity when said layer has the lower index of refraction of said group.

4. An optical switch in a one-dimensional multilayer dielectric stack having a photonic band gap, as set forth in claim 1, wherein said layer has a positive nonlinear coefficient, and wherein the width of said photonic band gap increases with increases in said intensity when said layer has the higher index of refraction of said group.

5. An optical switch in a one-dimensional multilayer dielectric stack having a photonic band gap, as set forth in claim 1, wherein said polymer material is a polydiacetylene 9-BCMU.

6. An optical switch in a one-dimensional multilayer dielectric stack having a photonic band gap, as set forth in claim 5, wherein said polydiacetylene 9-BCMU is ([CH$_2$]$_9$OCONHCH$_2$OCOC$_4$H$_9$).

7. An optical switch in a one-dimensional multilayer dielectric stack having a photonic band gap, comprising:

(a) a stack of groups of three or more layers of dielectric material whose operational frequency is near the edge of said photonic band gap;

(b) at least one layer of each of said groups being composed of a nonlinear c$_3$ dielectric polymer material, creating an intensity-dependent shift in the location of said photonic band gap and producing a dynamical change in the transmissive and reflective properties of said structure in response to changes in the intensity of light or the transmittance of electromagnetic, radiation passing through said multilayer dielectric stack;

(c) wherein said one layer of each of said groups has a negative nonlinear coefficient c$_3$, such that the index of refraction of one of the materials in said stack, n$_2$=n$_0$−c$_3$I, where I equals the intensity of the light propagating in said dielectric stack, for generating switching behavior, with linear and nonlinear absorption coefficients not exceeding 840/cm and 9×10$^{-5}$ cm/kW, respectively; such that the magnitude of the nonlinear index of refraction not be smaller than $c_3=2\times10^{-7}$ cm$^2$/kW; and (d) wherein the width of said photonic band gap is determined by the differences between the refractive indices of said nonlinear dielectric material and that of the other layers of dielectric material in said multilayer dielectric stack.

8. An optical switch in a one-dimensional multilayer dielectric stack having a photonic band gap, as set forth in claim 7, wherein said polymer layer has a negative nonlinear coefficient, and wherein the width of said photonic band gap decreases with increases in said intensity when said layer has the higher index of refraction of said group.

9. An optical switch in a one-dimensional multilayer dielectric stack having a photonic band gap, as set forth in claim 7, wherein said one layer of each of said groups has a positive nonlinear coefficient, for generating switching behavior.

10. An optical switch in a one-dimensional multilayer dielectric stack having a photonic band gap, as set forth in claim 9, wherein said layer has a positive nonlinear coefficient, and wherein the width of said photonic band gap decreases with increases in said intensity when said layer has the lower index of refraction of said group.

11. An optical switch in a one-dimensional multilayer dielectric stack having a photonic band gap, as set forth in claim 9, wherein said layer has a positive nonlinear coefficient, and wherein the width of said photonic band gap increases with increases in said intensity when said layer has the higher index of refraction of said group.

12. An optical switch in a one-dimensional multilayer dielectric stack having a photonic band gap, as set forth in claim 7, wherein said polymer material is a polydiacetylene 9-BCMU.

13. An optical switch in a one-dimensional multilayer dielectric stack having a photonic band gap, as set forth in claim 12, wherein said polydiacetylene 9-BCMU is ([CH$_2$]$_9$OCONHCH$_2$OCOC$_4$H$_9$).

* * * * *